(12) United States Patent
Rubenstein

(10) Patent No.: US 7,983,671 B2
(45) Date of Patent: *Jul. 19, 2011

(54) METHODS AND APPARATUS TO PERFORM WIRELESS PEERING IN COMMUNICATION SYSTEMS

(75) Inventor: David Rubenstein, Naperville, IL (US)

(73) Assignee: AT&T Intellectual Property I, LP, Altanta, GA (US)

( * ) Notice: Subject to any disclaimer, the term of this patent is extended or adjusted under 35 U.S.C. 154(b) by 145 days.

This patent is subject to a terminal disclaimer.

(21) Appl. No.: 12/352,406

(22) Filed: Jan. 12, 2009

(65) Prior Publication Data

US 2009/0117910 A1    May 7, 2009

Related U.S. Application Data

(63) Continuation of application No. 11/022,620, filed on Dec. 27, 2004, now Pat. No. 7,499,702.

(51) Int. Cl.
*H04W 40/00* (2009.01)

(52) U.S. Cl. ...................................................... 455/428

(58) Field of Classification Search .................. 455/560, 455/445, 3.01, 3.05, 3.06, 403, 553.1, 428, 455/405, 414.1, 406, 456.1, 457, 561, 11.2, 455/426.1, 435.1, 435.2, 435.3, 417, 562.1, 455/461, 450, 452.2, 509, 464, 67.11, 411, 455/453, 67.13; 370/350, 324, 452, 503, 370/58, 59, 66, 70, 71, 72, 424, 427, 472, 370/476, 465, 468, 470, 473, 474, 454, 352, 370/351; 709/203, 204, 206

See application file for complete search history.

(56) References Cited

U.S. PATENT DOCUMENTS

| | | | |
|---|---|---|---|
| 5,550,820 | A | 8/1996 | Baran |
| 5,940,775 | A | 8/1999 | Kim |
| 5,974,133 | A | 10/1999 | Fleischer, III et al. |
| 6,065,061 | A | 5/2000 | Blahut et al. |
| 6,292,662 | B1 | 9/2001 | Ziv et al. |
| 6,363,080 | B1 | 3/2002 | Katko |
| 6,385,312 | B1 | 5/2002 | Shaffer et al. |
| 6,434,228 | B1 | 8/2002 | Antrim et al. |
| 6,442,169 | B1 | 8/2002 | Lewis |
| 6,625,168 | B1 | 9/2003 | Langer et al. |
| 6,738,470 | B1 | 5/2004 | Aaronovitz |
| 2001/0009860 | A1 | 7/2001 | Mizell et al. |

(Continued)

FOREIGN PATENT DOCUMENTS

WO    9966738    12/1999

OTHER PUBLICATIONS

International Searching Authority, International Search Report and Written Opinion from corresponding PCT Application No. PCT/US2005/041396, dated Sep. 18, 2006, 5 pages.

(Continued)

*Primary Examiner* — Melody Mehrpour
(74) *Attorney, Agent, or Firm* — Hanley, Flight & Zimmerman, LLC.

(57) ABSTRACT

Methods and apparatus to route communications at an interexchange carrier are disclosed. One method of routing communications may include receiving a communication at the interexchange carrier, determining a destination at which the communication is to terminate, and routing the communication from the interexchange carrier through a terminating access charge free line to a terminating mobile telephone switching office.

21 Claims, 6 Drawing Sheets

U.S. PATENT DOCUMENTS

2003/0144929 A1 7/2003 Wakamatsu
2003/0198216 A1 10/2003 Lewis
2004/0190696 A1 9/2004 Fleischer, III et al.
2005/0037750 A1 2/2005 Goering et al.
2005/0041795 A1 2/2005 Goldstein et al.

OTHER PUBLICATIONS

International Bureau, International Preliminary Report on Patentability from corresponding PCT Application No. PCT/US2005/041396, issued Jul. 3, 2007, 4 pages.

United States Patent and Trademark Office, Notice of Allowance and Fees Due for U.S. Appl. No. 11/022,620, mailed Sep. 30, 2008, 8 pages.

United States Patent and Trademark Office, Notice of Panel Decision for U.S. Appl. No. 11/022,620, mailed Sep. 25, 2008, 2 pages.

United States Patent and Trademark Office, Office Action for U.S. Appl. No. 11/022,620, mailed Mar. 6, 2007, 19 pages.

United States Patent and Trademark Office, Office Action for U.S. Appl. No. 11/022,620, mailed Jun. 13, 2006, 15 pages.

United States Patent and Trademark Office, Office Communication for U.S. Appl. No. 11/022,620, mailed Jan. 2, 2009, 3 pages.

METHODS AND APPARATUS TO PERFORM WIRELESS PEERING IN COMMUNICATION SYSTEMS

CROSS REFERENCE TO RELATED APPLICATION

This is a continuation of U.S. patent application Ser. No. 11/022,620, filed on Dec. 27, 2004, now U.S. Pat. No. 7,499, 702, the entire content of which is incorporated herein by reference.

TECHNICAL FIELD

The present disclosure pertains to communication systems and, more particularly, to methods and apparatus to perform wireless peering in communication systems.

BACKGROUND

Wireless communication systems, such as cellular and personal communication systems, have become increasingly popular. Years ago, subscriber cost of owning a wireless communication device (e.g., a cellular telephone), which included the hardware and the service plan provided by the wireless carrier, was quite high. As the cost of ownership has decreased, the number of wireless communication system users has increased.

The widespread popularity of wireless communications has lead to intense competition in the marketplace. Wireless carriers heavily advertise and structure multiple, differentiated service plans to entice customers to subscribe to their service(s). This competition has also increased price pressure on wireless carriers, thereby driving wireless carriers to find more and more efficient business practices.

One major source of cost for wireless carriers are the interconnection charges incurred when routing wireless calls through landline networks. For example, when a wireless subscriber places a call directed outside his/her local access and transport area (i.e., an inter-LATA call), a mobile telephone switching office (MTSO) receives the call information from the wireless communication device (e.g., the subscriber's cellular telephone). The MTSO routes the call through dedicated access lines (DALs) to a long distance carrier (LD), which may also be referred to as an interexchange carrier (IXC). In the alternative, DALs may not be present and the MTSO may route the call to the LD or IXC via a first local exchange carrier (LEC). The LD, in turn, routes the call into a second LEC over direct end office trunks (DEOTs) or access tandem trunks. The connection from the LD to the LEC causes the LD to incur terminating access charges for the use of the LEC. The LD may pass these terminating charges to a wireless carrier, which may, in turn, pass the terminating charges onto the wireless subscriber. These charges are either borne by the LD or passed on to the wireless carrier, thereby reducing profitability of the wireless carrier. If the charges are further passed to a wireless subscriber, such charges affect the subscriber usage cost and, in turn, possibly affect the subscriber's value perception of the service subscription.

BRIEF DESCRIPTION OF THE DRAWINGS

FIG. 7 is a flow diagram representative of an example process performed by the terminating MTSO of FIG. 1.

DETAILED DESCRIPTION

Figure 1:
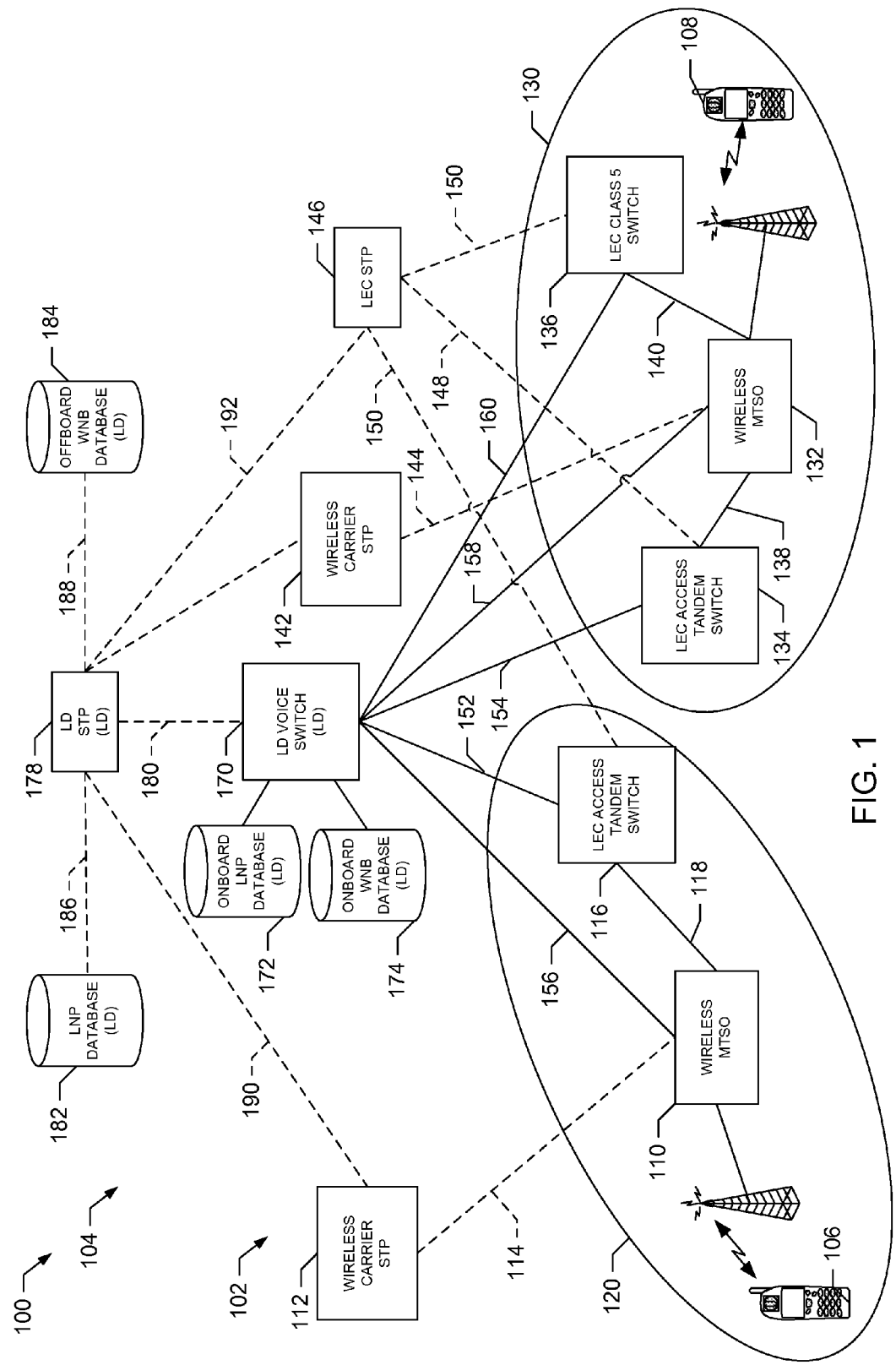
FIG. 1 is a diagram of an example wireless network in which wireless peering is implemented.

As shown in FIG. 1, a wireless network 100 includes local space 102 and long distance space 104, each of which includes a number of components and interconnections that are described in detail below. For ease of reference, the long distance space components are designated with (LD) in FIG. 1. As disclosed herein, when a first wireless device 106 initiates a wireless call from the local space 102 that passes through the long distance space 104 on its way to a second wireless device 108, LEC charges are eliminated because DALs are used to link the long distance space 104 to the MTSO supporting the second wireless device 108. For clarity and ease of understanding voice-carrying communication lines are shown as solid lines in FIG. 1, whereas signaling lines are shown as dashed lines.

Turning now in further detail to FIG. 1, the local space 102 includes the first wireless device 106 in communication with a first wireless MTSO 110. For ease of description, the first wireless device 106 and the first wireless MTSO 110 are referred to as the originating wireless device 106 and the originating MTSO 110. However, it will be readily understood that the designation of these components as originating is merely for purposes of clearly describing the call flow of the example.

The originating MTSO 110 is linked to a wireless carrier signal transfer point (STP) 112 via signaling lines 114. In terms of local space components, the originating MTSO 110 is also linked to an LEC access tandem switch 116, via type 2 trunks 118. The originating MTSO 110 and the LEC access tandem switch 116 reside within a first LATA 120.

A second LATA 130, in which the second wireless device 108 is disposed, includes a second wireless MTSO 132. The second wireless device 108 and the second wireless MTSO 132 are referred to hereinafter as the terminating wireless device 108 and the terminating MTSO 132, respectively. It will be readily appreciated that the reference to the wireless device 108 and the wireless MTSO 132 as "terminating" is merely for purposes of call flow description in this example.

As will be readily appreciated by those having ordinary skill in the art, the first and second LATAs 120, 130 may be located in geographically separated areas. For example, the first and second LATAs 120, 130 may be located in different areas of the same state or county. Additionally, the MTSOs 110, 132 may be located in vastly separated geographical areas, such as in different countries or on different continents.

The terminating MTSO 132 is coupled to an LEC access tandem switch 134 and/or an LEC class 5 switch 136 via type 2 trunks 138 and 140, respectively. The terminating MTSO 132 is coupled to a wireless carrier STP 142 via signaling lines 144. The LEC access tandem switch 134 and the LEC class 5 switch 136 are coupled to an LEC STP 146 via signaling lines 148 and 150, respectively. The LEC STP 146 is also coupled to the LEC access tandem switch 116 via signaling lines 150. Of course, the access tandem switch 116 could be serviced by an alternate, geographically proximate STP via a signaling network.

The MTSOs 110, 132 may be implemented using any suitable MTSOs, such as those used by Cingular wireless. For example, the originating MTSO 110 may be manufactured by Siemens, Motorola, etc.

To facilitate inter-LATA connectivity (i.e., communication between the LATA 120 and the LATA 130) via the long distance space 104, the LEC access tandem switches 116, 134 are coupled to the long distance space 104 via access tandem trunks 152, 154, respectively. Further, in the example of FIG. 1, the MTSOs 110, 132, and the LEC class 5 switch 136 are coupled to the long distance space 104 via DALs 156, 158, and a DEOT 160.

The long distance space 104 includes an LD voice switch 170 (also referred to hereinafter as an interexchange carrier) that provides inter-LATA connectivity between the LATA 120 and the LATA 130. As described above and as well known by those having ordinary skill in the art, the LD voice switch 170 conveys voice signals using both DALs (e.g., the DALs 156 and 158) and access tandem trunks (e.g., the access tandem trunks 152, 154). However, in contrast to prior systems, the DALs 156, 158, which connect the LD voice switch 170 to the MTSOs 110, 132, are configured to operate in a bi-directional manner. The DALs 156, 158 are not subject to interconnection charges and, therefore, the bi-directional DALs may be used to provide inter-LATA connectivity between the MTSOs 110, 132 without incurring additional LEC terminating access charges (i.e., terminating access charges).

According to one example, the long distance space 104 further includes an onboard local number portability (LNP) database 172 and an onboard wireless number block (WNB) database 174, both of which may be coupled directly to the LD voice switch 170. The databases 172, 174 may be implemented using one or more databases located on a single device such as a hard drive. Alternatively, the databases 172, 174 may be implemented on individual devices.

The LD voice switch 170 (i.e., an interexchange carrier) is coupled to an LD STP 178 via signaling lines 180. The LD STP 178 may, in turn, be coupled to an off board LNP database 182, an off board WNB database 184, the wireless carrier STP 112, and the LEC STP 146, via signaling lines 186, 188, 190, and 192, respectively. The databases 182, 184 may be implemented using any suitable database technology on any suitable media. The databases 182, 184 are coupled to the signaling network and may be queried by the LD voice switch 170, even though the databases 182, 184 may not be located proximate the LD voice switch 170.

The WNB databases 174, 184 may be implemented as portions or images of the Local Exchange Routing Guide (LERG) database, which is a database that accounts for the number blocks that are assigned to various entities or locations. For example, Cingular wireless may be assigned numbers in the block between the number (847) 312-0000 and the number (847) 312-4999. The portions of the WNB databases 174, 184 that are relevant to a particular LD are defined by the peering partnerships the LD has. A peering partnership is a business relationship between a LD and a wireless carrier. For example, SBC, a known LD, may have a peering partnership with the Cingular network. Accordingly, the portions of the WNB databases 174, 184 relevant to SBC would include the number blocks assigned to Cingular customers. Through the use of peering partnerships, LEC terminating access charges (or simply terminating access charges) may be reduced or eliminated through the use of terminating access charge free lines running between the LD and the MTSO supporting a wireless subscriber.

The LNP databases 172, 182 may be images of databases that are maintained by a governmental entity, such as the Federal Communications Commission (FCC), to track telephone numbers that have been ported from their home office. The LD voice switch 170 uses the databases 174, 184 and the databases 172, 182 to determine whether a call destination is a wireless subscriber and whether that wireless subscriber has moved his/her wireless number to another network (e.g., another wireless network).

Generally, during operation, the originating wireless device 106 establishes communication with the originating MTSO 110. Such communication may be, for example, a message including an automatic number identification (ANI) of the originating party and an ANI of the terminating party, which, for this example, is the terminating wireless device 108. The originating MTSO 110 determines in a known manner that the call is an inter-LATA call that must be routed through the long distance space 104. Accordingly, the originating MTSO 110 uses the signaling network, which may be implemented by a Signaling System 7 (SS7) network or any other suitable network, to contact the LD voice switch 170 to reserve a circuit on the DAL 156 to provide voice connectivity.

As part of the communications between the originating MTSO 110 and the LD voice switch 170 (i.e., the interexchange carrier), the LD voice switch 170 determines the destination for the call (e.g., the LD voice switch 170 may use the ANI of the terminating party provided by the originating MTSO 110). As described in detail below, based on, for example, the ANI information of the terminating wireless device 108, the LD voice switch 170 determines if the destination of the call is a wireless device that has not ported from its home office. If the destination of the call is a wireless device (as it is in the example of FIG. 1), the LD voice switch 170 contacts the terminating MTSO 132 to reserve a circuit on the DAL 158. The use of the DAL 158 eliminates the interconnection charges associated with LECs.

Figure 2:
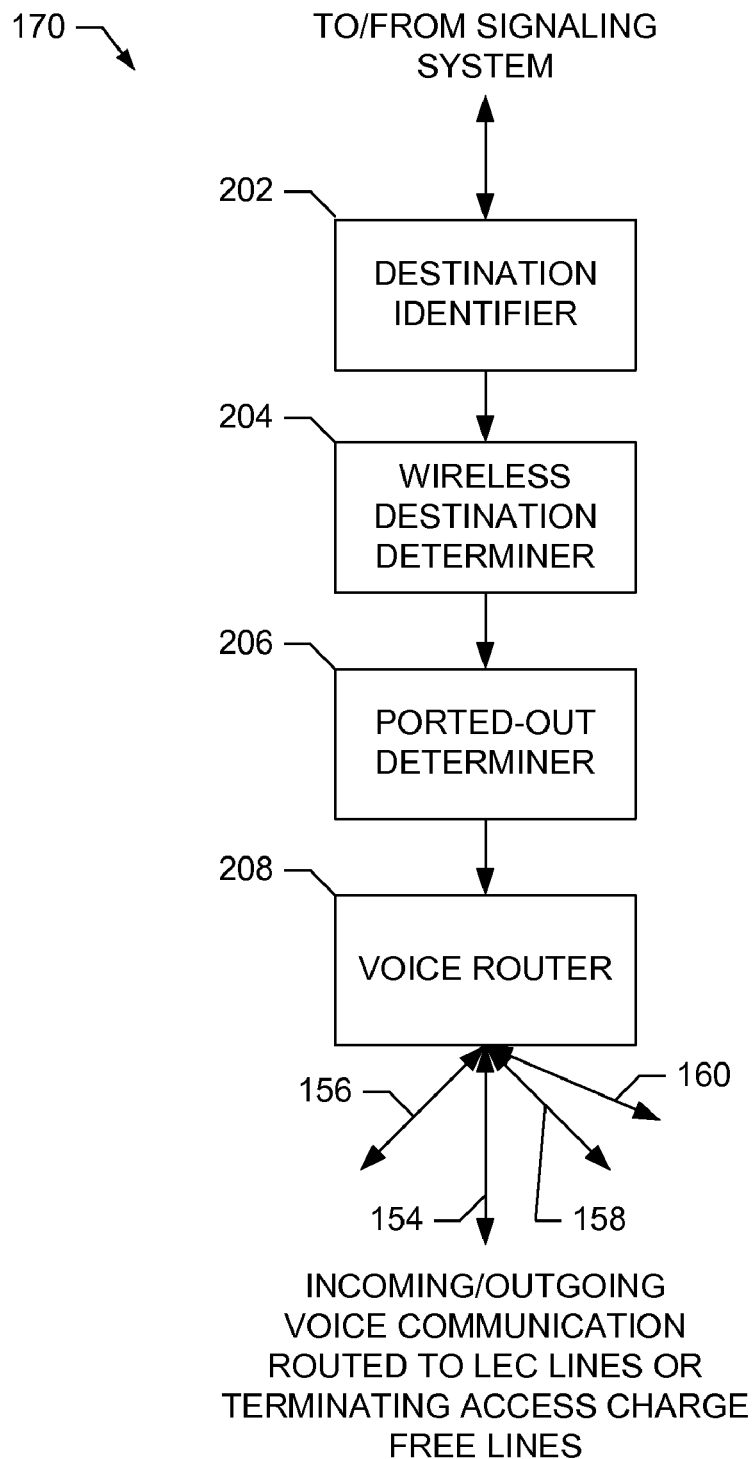
FIG. 2 is a block diagram representation of the relevant aspects of the LD voice switch of FIG. 1.

As shown in further detail in FIG. 2, the LD voice switch 170 includes a destination identifier 202 coupled to a wireless destination determiner 204. The wireless destination determiner 204 is, in turn, coupled to a ported-out determiner 206 that is coupled to a voice router 208. Additionally, the voice router 208 is coupled to the access tandem trunk 154, as well as the DALs 156, 158, and the DEOT 160.

In operation of the LD voice switch 170, the destination identifier 202 receives signaling messages from, for example, the originating MTSO 110 via the signaling system. The signaling messages include information identifying the destination or termination point for the call (i.e., the telephone number of the called party). The destination identifier 202 processes the signaling messages to determine the destination of the call.

The destination of the call, as determined by the destination identifier 202, passes to the wireless destination determiner 204. The wireless destination determiner 204 determines if the call destination is a wireless subscriber, such as the wireless device 108 having a peering partnership with the LD by virtue of the wireless carrier having a business relationship with the LD. As described in further detail below, this determination may be made using the WNB databases 174, 184.

If the call destination is a wireless subscriber, the ported-out determiner 206 determines whether the wireless subscriber has ported out of his or her home office. That is, the wireless destination determiner 204 makes a preliminary determination as to whether the call destination is a wireless caller and the ported-out determiner 206 determines whether the call destination is still a wireless caller, or whether the user has ported his or her wireless telephone number over to another communication system, such as another provider. The ported-out determination may be carried out using the LNP databases 172, 182.

Based on the determinations made by the wireless destination determiner 204 and the ported-out determiner 206, the voice router 208 controls how the communication received from the originating MTSO 110 on the DAL 156 is routed. If the call destination is not a wireless caller, or is a wireless number that has been ported out, the voice router 208 routes the call to the destination through conventional paths, including, for example, the LEC access tandem 154. Alternatively, if the call destination is a wireless caller who has not ported out of the system, the communication from the originating MTSO 110 is routed to the terminating MTSO 132 via the DAL 158, thereby wirelessly peering the first and second wireless devices 106, 108. Further implementational detail is provided below in conjunction with FIGS. 3-6, which include schematic and flow diagram representations of further example implementations of the LD voice switch 170.

Figure 3:
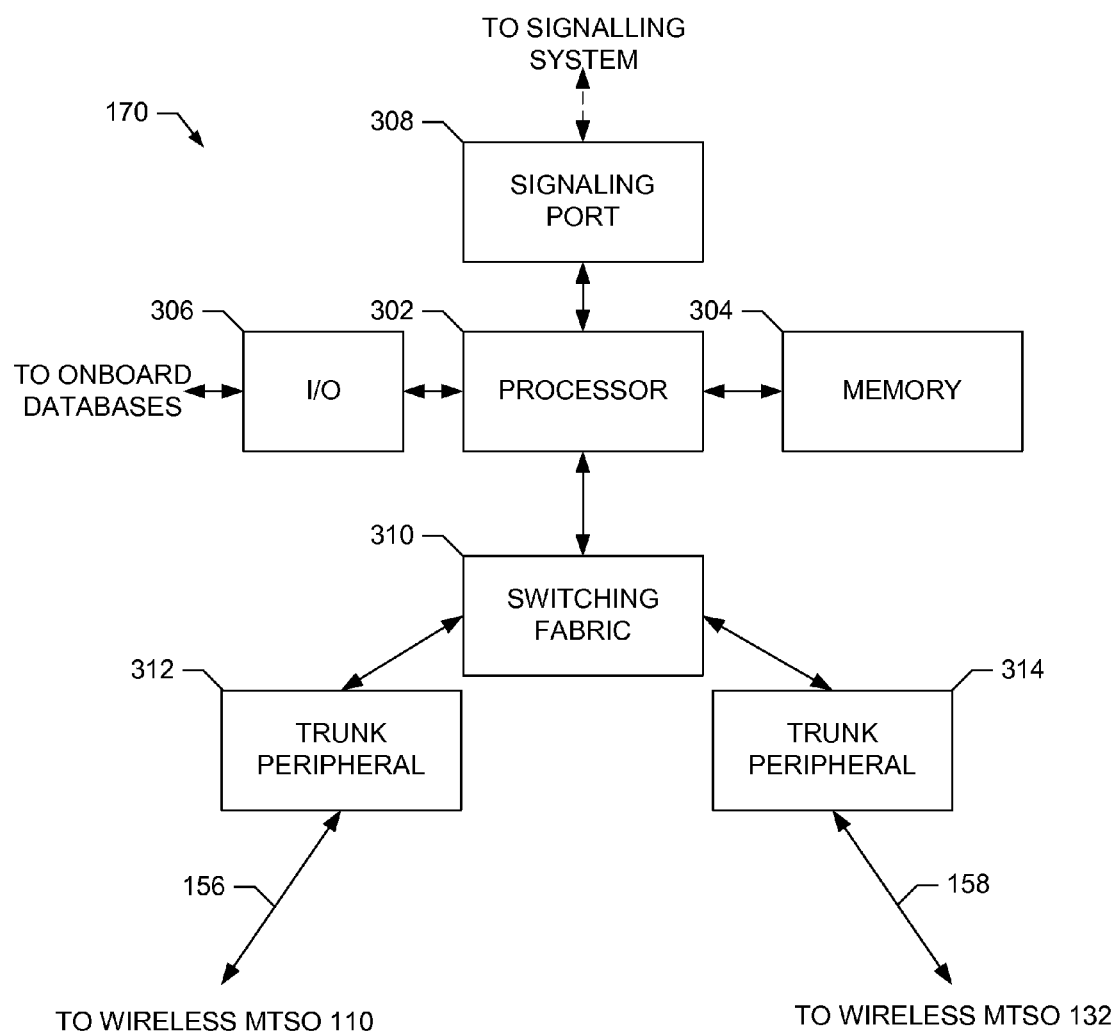
FIG. 3 is a schematic diagram of an implementation of the LD voice switch of FIG. 1 using time domain multiplexing (TDM) technology.

As shown in FIG. 3, the LD voice switch 170 (i.e., the interexchange carrier), in one implementation, includes a processor 302 having associated memory 304 and input/output (I/O) hardware 306. The processor 302 is also coupled to a signaling port 308 to support, for example, SS7 signaling, and switch fabric 310, also referred to as a switch matrix. The switch fabric 310 is coupled to one or more trunk peripherals 312, 314, that are coupled to the DALs 156, 158. The LD voice switch 170 of FIG. 3 is a time domain multiplexed (TDM) switch.

The processor 302 may be any type of processing unit, such as a microprocessor from the Intel® Pentium® family of microprocessors, the Intel® Itanium® family of microprocessors, and/or the Intel XScale® family of processors. The memory 304 may be any suitable memory device and may be sized to fit the storage and operational demands of the LD voice switch 170. The memory 304 may be random access memory (RAM), read only memory (ROM), or any other magnetic or optical memory. The memory 304 may store instructions, such as those used to implement the functionality of FIG. 6 below, which are retrieved and executed by the processor 302. The memory 304 could be a part of, or be separate from, the processor 302.

The I/O hardware 306 may be any suitable hardware, such as a bus. Although the I/O hardware 306 is shown as being separate from the processor 302, the I/O hardware 306 could form a part thereof. As shown, the I/O hardware 306 may be connected to the onboard LNP database 172 and the onboard WNB database 174.

The signaling port 308 may be any suitable hardware and/or software device or devices that perform signaling using any suitable protocol. For example, the signaling port 308 may be configured to carry out communications using the SS7 signaling protocol, or any other suitable protocol.

The switching fabric 310 may be any suitable device that is commonly known to those having ordinary skill in the art. In general, as known to those having ordinary skill in the art, the switching fabric 310 responds to commands, signals, or instructions from the processor 302 to control interconnection between the trunk peripherals 312, 314. As disclosed herein, in response to signals from the processor 302, the switching fabric 310 may interconnect the trunk peripherals 312, 314 to transfer signals from the DAL 156 to the DAL 158, thereby providing LEC terminating access charge free voice connectivity between the originating MTSO 110 and the terminating MTSO 132.

The trunk peripherals 312, 314 are interface devices that communicate with the DALs 156, 158 to provide connectivity between the MTSOs 110, 132 and the LD voice switch 170. As will be readily appreciated by those having ordinary skill in the art, the trunk peripherals 312, 314 may be configured to define the DALs 156, 158 for uni-directional or bi-directional communication. As disclosed herein, the trunk peripherals 312, 314 are configured to define the DALs 156, 158 for bi-directional communication so that communications between the MTSOs 110, 132 may be carried out without traversing LEC lines that accrue terminating access charges.

Figure 4:
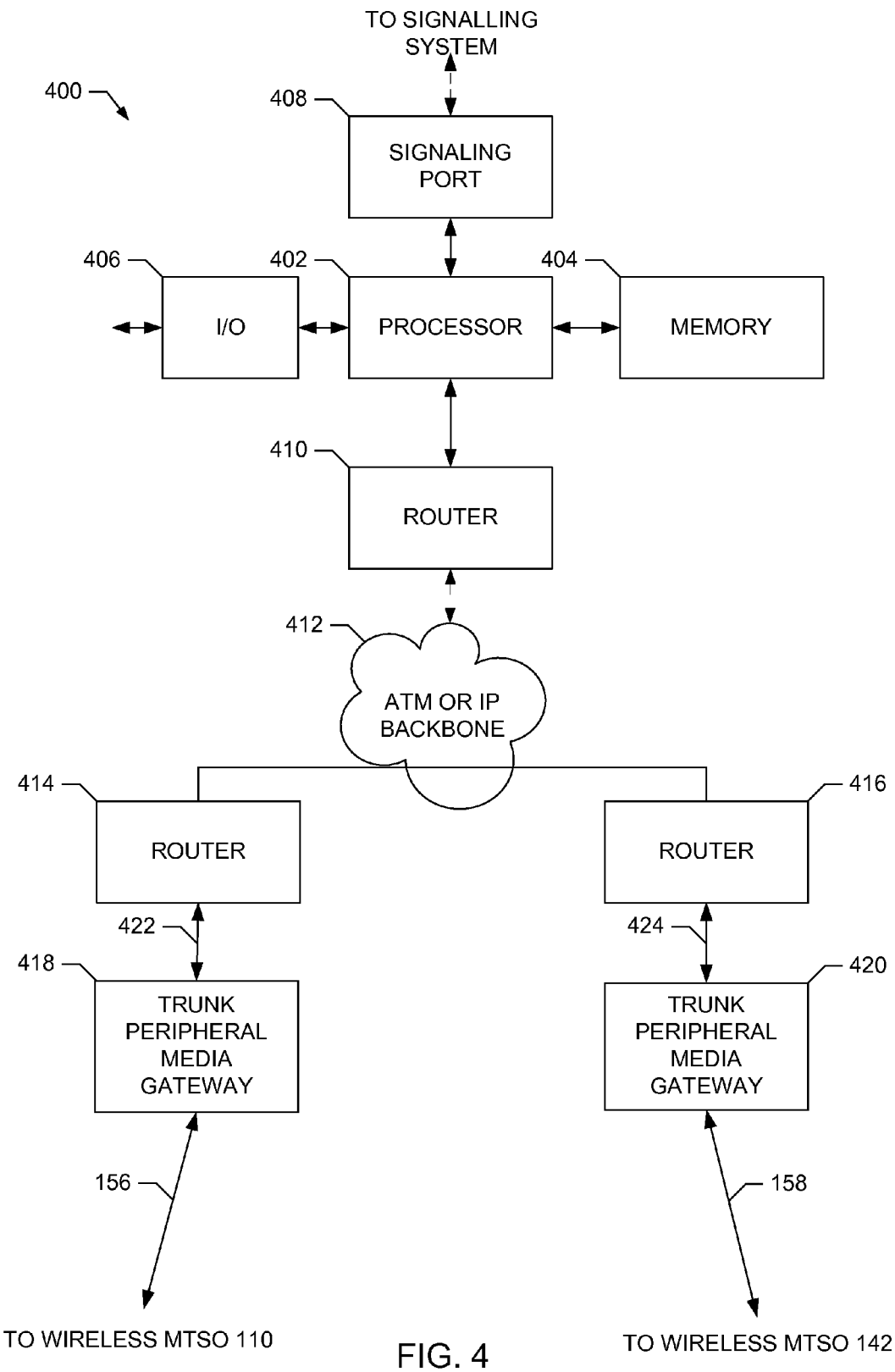
FIG. 4 is a schematic diagram of an implementation of the LD voice switch of FIG. 1 using TMD and Internet protocol (IP) technology.

FIG. 4 shows an alternate implementation of the LD voice switch 400, which operates using TDM and Internet protocol (IP) techniques. As described in detail below, TDM components interface to certain portions of the network that operate using TDM. Other portions of the LD voice switch 400 operating using IP. The LD voice switch 400 may be referred to as a soft switch. While the LD voice switch 170 components are concentrated in a single geographical location, the components of the LD voice switch 400 may be geographically dispersed.

In particular, like the LD voice switch 170 described in conjunction with FIG. 3, the LD voice switch 400 includes a processor 402, a memory 404, I/O hardware 406, and a signaling port 408. However, the LD voice switch 400 of FIG. 4 includes a router 410, such as a packet switched router that is configured to route IP formatted packets in a desired manner. The router 410 interfaces to a network 412, such as an asynchronous transfer mode (ATM) network or an IP backbone. As will be readily appreciated by those having ordinary skill in the art, the network 412 may be any suitable network, including the Internet.

As shown in FIG. 4, routers 414, 416 connect to one another through the network 412. Like the router 410, the routers 414 and 416 are configured to transfer IP packets over the network 412, thereby enabling IP-formatted calling information, such as voice over IP (VOIP) to be carried out. The routers 414, 416 are coupled to trunk peripheral media gateways 418, 420, via IP voice virtual trunks 422, 424. The trunk peripheral media gateways 418, 420 are coupled to the wireless MTSOs 110, 142. The switching fabric 310 of FIG. 3, is effectively replaced by a wide area data network in FIG. 4.

When voice information is received by the trunk peripheral gateway 418 in a TDM format, the trunk peripheral gateway 418 converts the TDM information into IP formatted information. In other words, the call is converted from a TDM format to an IP format that may be routed over the network 412. The router 414 then communicates with the router 410 that provides routing information for the call. Accordingly, the call will then be appropriately routed through the network 412. The router 416 passes the IP formatted call information to the trunk peripheral media gateway 420, which converts the call information from the IP format to a TDM format before passing the call information to the wireless MTSO 142.

With regard to wireless peering, the LD voice switch 400 may operate in a similar or identical manner to the LD voice switch 170. That is, the LD voice switch 400 may receive a call, determine the destination of the call and whether that call is a wireless subscriber that is eligible to be wirelessly peered based on a wireless peering partnership the wireless carrier has with the LD. If wireless peering is available, the call is routed via lines that do no carry terminating charges, such as LEC terminating access charges.

The following describes various example processes that may be used to implement the disclosed system. In particular, FIGS. 5-7 disclose processes carried out by the originating MTSO 110, the LD voice switch 170, and the terminating MTSO 132, respectively, to route calls from the originating MTSO 110 to the terminating MTSO 132 without the terminating access charge bearing lines (i.e., thorough terminating access charge free lines such as DALs 156, 158). The result is that the first and second wireless devices 106, 108 are peered together. Although for ease of description the processes of FIGS. 5-7 are described in series, certain portions of such processes may temporally overlap one another and/or such processes may interact with one another.

Figure 5:
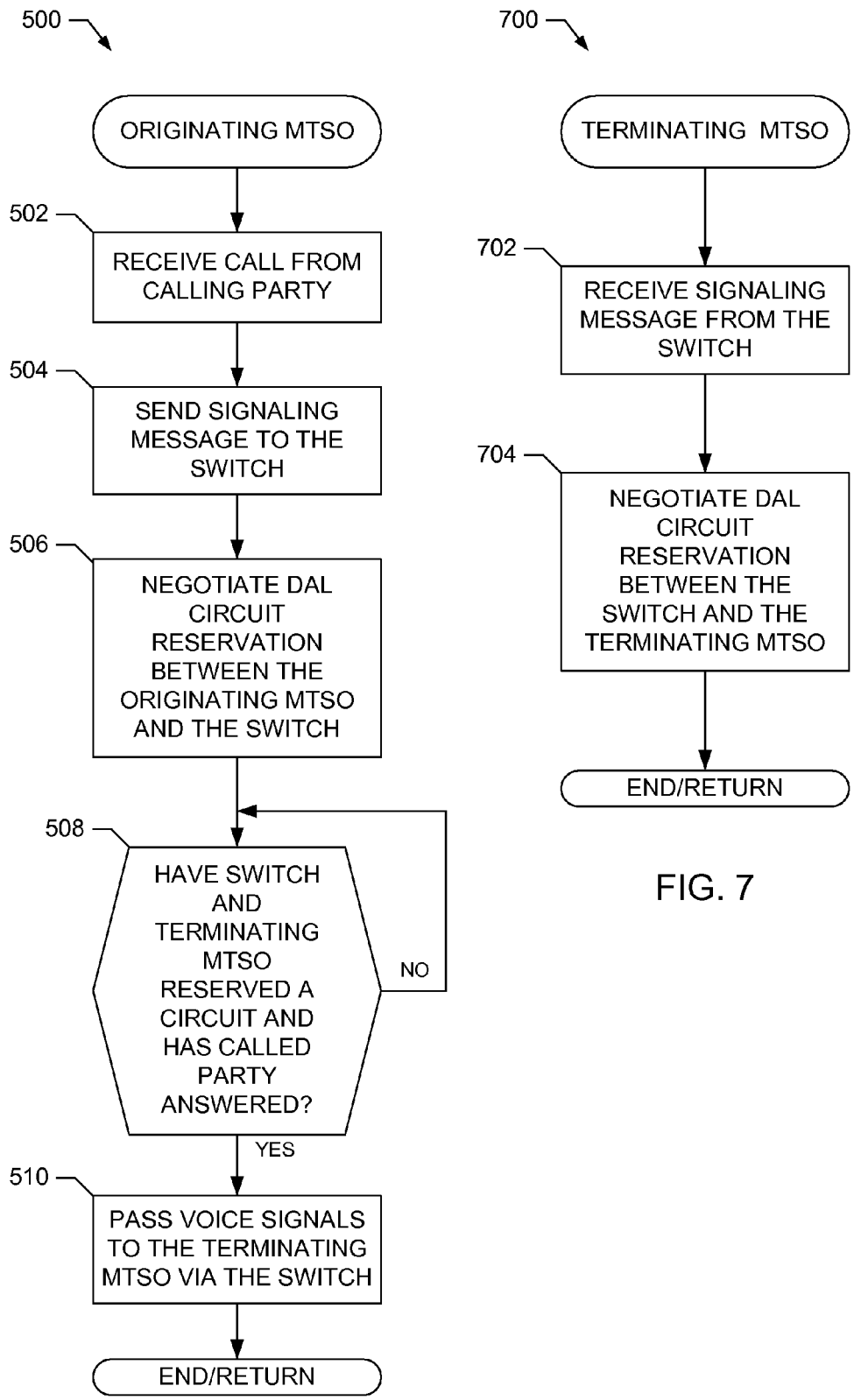
FIG. 5 is a flow diagram representative of an example process performed by the originating MTSO of FIG. 1.
Figure 6:
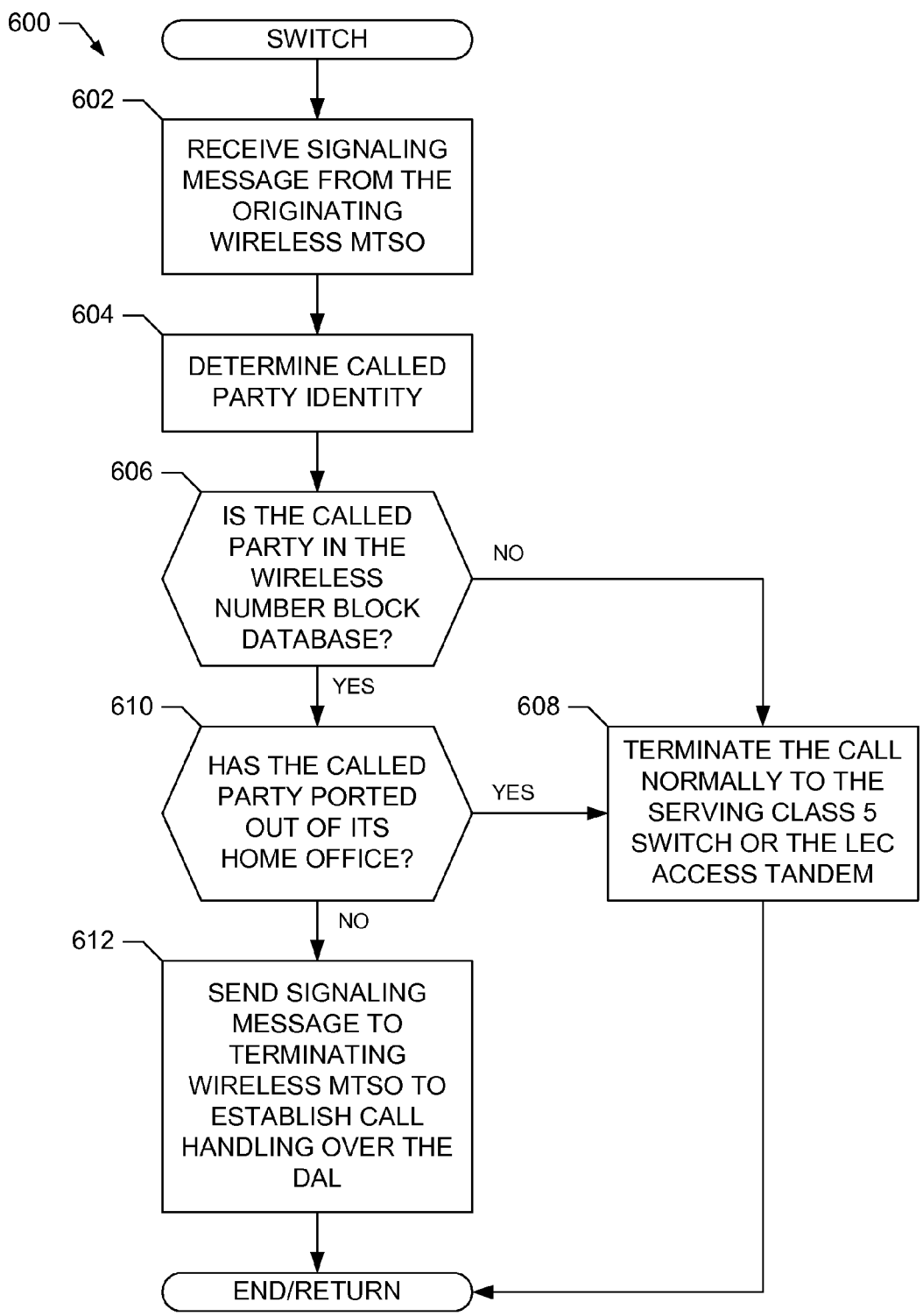
FIG. 6 is a flow diagram representative of an example process performed by the LD voice switch of FIG. 1.

An example, originating MTSO process 500, which may be carried out by the originating MTSO 110, is shown in FIG. 5. The following description of FIG. 5 is provided with reference to the network configuration shown in FIG. 1. Accordingly, the functionality of the process 500 will be described with respect to components or structures shown in FIG. 1, but such description is merely for illustrative purposes. It will be readily understood that the process 500 may be used in conjunction with other network configurations than that shown in FIG. 1. Generally, the process 500 may be carried out by hardware and/or software implementing the originating MSTO 110. For example, software instructions or code may be executed by a processor or some other device to implement the functionality represented by FIG. 5. As will be readily appreciated by those having ordinary skill in the art, the functionality represented in FIG. 5 is similar or identical to conventional functionality typically included in a MTSO. In general, as described in detail below, the process 500 includes signaling and voice control that is conventionally carried out between the originating MTSO 110 and the LD voice switch 170.

Turning now to FIG. 5 in detail, the originating MTSO process 500 begins when the originating MTSO 110 receives a call from a calling party (block 502). For example, the first wireless device 106 communicates with the originating MTSO 110 to manifest a user's desire to originate a call. The process 500 then determines the location at which the call is to be terminated and, if the call is an inter-LATA call, sends a signaling message to the LD voice switch 170 to request establishment of a communication link over the DAL 156 (block 504). Subsequently, the originating MTSO 110 and the LD voice switch 170 negotiate reservation of a circuit on the DAL 156 connecting the MTSO 110 and the LD voice switch 170 (block 506).

After the circuit has been reserved between the originating MTSO and the switch (block 506), it is determined if the switch and the terminating MTSO have reserved a circuit and whether the called party has answered the request for communication (block 508). The process 500 waits for the circuit to be reserved and the called party to answer before passing voice signals to the terminating MTSO via the switch (block 510).

As will be readily appreciated by those having ordinary skill in the art, the switching communications that take place between the MTSO 110 and the LD voice switch 170 may be carried out using the switching system lines shown as dotted lines in FIG. 1, using various signal transfer points. For example, the MTSO 110 may communicate with the LD voice switch 170 via the wireless carrier STP 112 and the LD STP 178.

A switch process 600 is shown in FIG. 6. The switch process 600 may be carried out by software executed on a processor, such as the processor 302 of the LD voice switch 170. For example, machine readable instructions implementing the functionality of the process 600 may be stored in the memory 304 or the processor 302 and executed by the processor 302 to carry out the functionality of the process 600 of FIG. 6. Alternatively, the instructions may be stored in the memory 404 or the processor 402 and executed by the processor 402 to implement the functionality of FIG. 6.

The process 600 begins execution by the LD voice switch 170 receiving a signaling message from the originating MTSO 110 (block 602). For example, the signaling message that is received may be the signaling message sent at block 504 of FIG. 5. Upon receiving the signaling message (block 602), the LD voice switch 170 determines the identity of the called party (block 604). As will be readily appreciated by those having ordinary skill in the art, the LD voice switch 170 may determine caller identity using any number of different techniques including using ANI information provided in the signaling message from the originating MTSO 110.

After having determined the identity of the called party (block 604), the LD voice switch 170 determines if the called party has a number found in the WNB database 174, 184 (block 606). As noted previously, the WNB database 174, 184 is a database that accounts for the number blocks that are assigned to various entities or locations. The portion of the WNB database 174, 184 that is searched corresponds to the network architecture, the owner of the LD voice switch 170, and any peering partnerships that the LD voice switch owner may have. For example, if SBC long distance is the owner of the LD voice switch 170 and Cingular Wireless, which is an affiliate of SBC, operates the MTSOs 110, 132, the LD voice switch 170 will query the portion of the WNB database that defines the numbers assigned to Cingular wireless customers to determine if the party being called is a Cingular customer to whom the benefit of eliminating terminating charge may be passed (i.e., if the called party is eligible to be peered with the calling party to avoid interconnection charges).

If the party being called is not in the WNB database (block 606), the LD voice switch 170 terminates the call normally via the class 5 switch or the LEC access tandem providing connectivity to the party being called (block 608). The process 600 then ends or returns to its calling routine.

As will be readily appreciated by those having ordinary skill in the art, the advent of telephone number portability allows a customer to change between wireless service carriers without changing his or her wireless telephone number. For example, a customer using originally using Verizon service and, therefore, having a telephone number falling in the Verizon portion of the WNB, may move (i.e., port) his or her number to a Cingular service plan. Accordingly, even though the customer has a Verizon number, that number has ported out of its home office. The WNB databases 174, 184 do not update to reflect porting that may have occurred. Accordingly, the LD voice switch, upon determining that the called party is in the wireless number block of interest, must account for customers who may have ported out of their home offices of service (block 610). As will be readily appreciated by those having ordinary skill in the art, the LD voice switch 170 may determine if the called party has ported out by checking one of the LNP databases 172, 182. If it is determined that the called party has ported out (block 610), the LD voice switch 170 terminates the call normally using the serving class 5 switch or the LEC access tandem (block 608), thus incurring LEC terminating access charges.

If the called party is within the WNB database (block 606) and the called party has not ported out from their home office (block 610), the LD voice switch 170 sends a signaling message to the terminating MTSO 132 to establish call handling over a DAL (block 612). For example, with reference to FIG.

1, the LD voice switch 170 communicates with the MTSO 132 to reserve a circuit on the DAL 158. Subsequently, the LD voice switch 170 passes the voice signals to the terminating MTSO 132 for eventual passage to the second wireless device 108, which is represented in FIG. 5 by block 510.

As described herein, the ability of the LD voice switch 170 to determine the destination of a call and whether that destination is handled by a MTSO with which the LD voice switch 170 has a DAL connection allows the LD voice switch 170 to avoid terminating access charges. In this manner, terminating access charge savings may be passed on to customers or recognized as increased profits. As will be readily appreciated, the LD voice switch 170 may have DAL connections with several MTSOs that are spread throughout the world and owned by a number of different wireless service providers. In such an arrangement, the LD voice switch 170 may selectively use DALs to connect directly to MTSOs. For example, for business reasons, the LD voice switch 170 may be configured not to use DAL connections for various wireless service providers. Such configuration may be implemented based on the portions of the WNB that the LD voice switch searches when a call is received. A call is handled through its normal terminating access charge bearing termination path when an entry corresponding to the called party is not found in the WNB. Accordingly, eliminating certain portions of the WNB from the search precludes the possibility that terminating access charge savings will be available for those call destinations.

While the foregoing has described functionality of the LD voice switch 170 using WNB and LNP databases, it is possible that one database could be maintained to track ported-in and ported-out numbers. The one database would, therefore, track wireless subscribers and the service providers to which they belong. Such a database could be maintained by a governmental entity, such as the FCC, or could be maintained by a private entity. Such an arrangement would eliminate the need to consult the WNB and then confirm porting status with the LNP because such a database would be updated with all relevant network and destination information. In this configuration, the LD voice switch 170 would determine the identity of the called party and consult the one database to determine if the called party could be reached using a DAL.

Turning now to FIG. 7, a terminating MTSO process 700 may be carried out by the terminating MTSO 132. The terminating MTSO 132 receives a signaling message from the LD voice switch 170 (block 702). Subsequently, the terminating MTSO 132 and the LD voice switch 170 negotiate a circuit reservation on the DAL 158 between the LD voice switch 170 and the terminating MTSO 132 (block 704). After the DAL circuit is established (block 704), voice signals are passed over the DAL 158 to the terminating MTSO 132, as shown at block 510 of FIG. 5.

Although the following discloses example systems including, among other components, software executed on hardware, it should be noted that such systems are merely illustrative and should not be considered as limiting. For example, while the foregoing describes the operation of the system in the context of a wireless-to-wireless call, the call could originate from a land line. The same wireless peering and peering partnership advantages exist for land line originating calls as from wireless calls. As a further example, it is contemplated that any or all of these hardware and software components could be embodied exclusively in dedicated hardware, exclusively in software, exclusively in firmware or in some combination of hardware, firmware and/or software. Accordingly, while the following describes example systems, persons of ordinary skill in the art will readily appreciate that the examples are not the only way to implement such systems. Additionally, although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of routing communications at an interexchange carrier comprising:
    receiving a communication in a first format at the interexchange carrier;
    selectively converting the communication in the first format into an Internet Protocol format;
    determining a destination at which the communication is to terminate;
    routing the Internet Protocol formatted communication to a router in the interexchange carrier associated with the destination;
    selectively converting the Internet Protocol formatted communication to a second format at the router; and
    routing at the router of the interexchange carrier the communication in the second format from the interexchange carrier through a terminating access charge free line to a terminating mobile telephone switching office.

2. A method as defined by claim 1, wherein the first format is a time domain multiplexed format.

3. A method as defined by claim 2, wherein the second format is the time domain multiplexed format.

4. A method as defined by claim 1, wherein the first format is the Internet Protocol format.

5. A method as defined by claim 4, wherein converting the communication in the first format into the Internet Protocol format is not carried out when the first format is the Internet Protocol format.

6. A method as defined in claim 4, wherein the second format is the Internet Protocol format.

7. A method as defined in claim 4, wherein the communication in the first format comprises a voice over Internet Protocol (VoIP) communication.

8. A method as defined in claim 1, wherein routing the Internet Protocol formatted communication to the router associated with the destination comprises routing the Internet Protocol formatted communication from a receiving router to the router associated with the destination.

9. A method as defined in claim 8, wherein routing the Internet Protocol formatted communication to the router associated with the destination comprises routing the Internet Protocol formatted communication through an Internet Protocol backbone.

10. A method as defined in claim 8, wherein routing the Internet Protocol formatted communication to the router associated with the destination comprises routing the Internet Protocol formatted communication through an Asynchronous Transfer Mode (ATM) network.

11. A method as defined in claim 8, wherein routing the Internet Protocol formatted communication to the router associated with the destination comprises routing the Internet Protocol formatted communication through an Internet network connection.

12. An apparatus to route communication at an interexchange carrier, the apparatus comprising:
    a first media gateway to receive a communication in a first format at the interexchange carrier and to selectively convert the communication into an Internet Protocol format;

a destination identifier to determine a destination at which the communication is to terminate;

a receiving router in communication with the first media gateway to route the Internet Protocol formatted communication to a router associated with the destination;

a second media gateway in communication with the router associated with the destination to receive the Internet Protocol formatted communication and to selectively convert the Internet Protocol formatted communication to a second format and to send the communication in the second format through a terminating access charge free line to a terminating mobile telephone switching office associated with the destination.

13. An apparatus as defined in claim 12, wherein the receiving router and the router associated with the destination are communicatively coupled through an Internet Protocol backbone.

14. An apparatus as defined in claim 12, wherein the receiving router and the router associated with the destination are communicatively coupled through an Asynchronous Transfer Mode (ATM) network.

15. An apparatus as defined in claim 12, wherein the receiving router and the router associated with the destination are communicatively coupled through an Internet network connection.

16. A computer readable media storing instructions that, when executed, cause one or more machines to:

receive a communication in a first format at an interexchange carrier;

selectively convert the communication in the first format into an Internet Protocol format;

determine a destination at which the communication is to terminate;

route the Internet Protocol formatted communication to a router in the interexchange carrier associated with the destination;

selectively convert the Internet Protocol formatted communication to a second format at the router; and route at the router of the interexchange carrier the communication in the second format from the interexchange carrier through a terminating access charge free line to a terminating mobile telephone switching office.

17. A computer readable medium as defined by claim 16, wherein the first format is a time domain multiplexed format.

18. A computer readable medium as defined by claim 16, wherein the first format is the Internet Protocol format.

19. A computer readable medium as defined by claim 18, wherein converting the communication in the first format into the Internet Protocol format is not carried out when the first format is the Internet Protocol format.

20. A computer readable medium 18, wherein the communication in the first format comprises a voice over Internet Protocol (VoIP) communication.

21. A method of routing communications at an interexchange carrier comprising:

receiving a communication in a first format at the interexchange carrier;

selectively converting the communication in the first format into an Internet Protocol format;

determining a destination at which the communication is to terminate;

routing the Internet Protocol formatted communication to the interexchange carrier associated with the destination;

selectively converting the Internet Protocol formatted communication to a second format; and routing at the interexchange carrier the communication in the second format from the interexchange carrier through a terminating access charge free line to a terminating mobile telephone switching office.

* * * * *